US 8,855,299 B2

(12) United States Patent
Gueron et al.

(10) Patent No.: US 8,855,299 B2
(45) Date of Patent: Oct. 7, 2014

(54) EXECUTING AN ENCRYPTION INSTRUCTION USING STORED ROUND KEYS

(75) Inventors: Shay Gueron, Haifa (IL); Martin G. Dixon, Portland, OR (US); Srinivas Chennupaty, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1698 days.

(21) Appl. No.: 11/966,792

(22) Filed: Dec. 28, 2007

(65) Prior Publication Data

US 2009/0168998 A1   Jul. 2, 2009

(51) Int. Cl.
  *H04L 9/00* (2006.01)
  *H04L 9/06* (2006.01)
(52) U.S. Cl.
  CPC .................................. *H04L 9/0681* (2013.01)
  USPC ............................................. 380/44; 380/28
(58) Field of Classification Search
  CPC ... H04L 2209/24; H04L 9/0631; H04L 9/085; H04L 63/08; H04L 63/28; H04L 9/06; H04L 9/0681
  USPC ...................................................... 380/28, 40
  See application file for complete search history.

(56) References Cited

U.S. PATENT DOCUMENTS

| 8,300,805 | B1 * | 10/2012 | Langhammer | 380/28 |
| 2002/0191784 | A1 * | 12/2002 | Yup et al. | 380/37 |
| 2003/0133568 | A1 * | 7/2003 | Stein et al. | 380/37 |
| 2004/0208072 | A1 * | 10/2004 | Henry et al. | 365/203 |
| 2004/0250090 | A1 * | 12/2004 | Crispin et al. | 713/189 |
| 2005/0213756 | A1 * | 9/2005 | Hubert | 380/44 |
| 2009/0034733 | A1 * | 2/2009 | Raman et al. | 380/277 |

* cited by examiner

*Primary Examiner* — Harunur Rashid
(74) *Attorney, Agent, or Firm* — Thomas R. Lane

(57) ABSTRACT

Embodiments of an invention for executing an encryption instruction using stored round keys are disclosed. In one embodiment, an apparatus includes instruction logic, encryption logic, a storage region, and control logic. The instruction logic is to receive an encryption instruction. The encryption logic is to perform, in response to the instruction logic receiving the encryption instruction, an encryption operation including a plurality of rounds, each round using a corresponding round key from a plurality of round keys. The storage region is to store the plurality of round keys. The control logic is to fetch, for use during each of the plurality of rounds, the corresponding round key from the storage region.

10 Claims, 3 Drawing Sheets

METHOD 200

METHOD 200

METHOD 300

EXECUTING AN ENCRYPTION INSTRUCTION USING STORED ROUND KEYS

BACKGROUND

1. Field

The present disclosure pertains to the field of information processing, and more particularly, to the field of encrypting information.

2. Description of Related Art

In an information processing system, secret information may be protected from discovery by encrypting it. Private key encryption algorithms, such as the advanced encryption standard ("AES") defined in Federal Information Processing Standard 197 from the National Institute of Standards and Technology, use a private key to transform unencrypted information ("plain-text") into encrypted information ("cipher-text") that generally has no meaning unless subsequently decrypted by a reverse transformation using the private key.

Some encryption algorithms, such as AES, may be characterized by their sequence of operations, known as a "round," that is performed on the plain-text to produce a first intermediate result, and then repeated exactly or substantially on the first intermediate result to produce a second intermediate result, and so on, until the information is satisfactorily encrypted. The private key is expanded or otherwise transformed to derive a series of "round keys" so that a different key is used during each round.

Each AES round is performed on 128 bits of data arranged in a two dimension array, called the state. Each encryption round, except the last round, includes combining the round key with the state, processing the state using a non-linear substitution table, shifting the rows of the state, and mixing the columns of the state. The mixing operation is omitted from the last round. The number of rounds depends on the length of the key. AES may use a 128, 192, or 256 bit key; the number of rounds is 10, 12, or 14, respectively.

BRIEF DESCRIPTION OF THE FIGURES

The present invention is illustrated by way of example and not limitation in the accompanying figures.

DETAILED DESCRIPTION

Embodiments of an invention for executing an encryption instruction using stored round keys are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

As described in the background section, encryption algorithms may include a number of operations, divided into a number of rounds, where each round may use a different version of a key. A processor or other hardware in an information processing system may be used to perform each of these operations by executing one or more general purpose instructions per operation. Alternatively, a processor may support one or more special instructions that may be executed to perform some combination of the required operations, such as a complete round or a complete encryption algorithm, in order to increase performance, but at a cost of increased circuitry and power consumption. Designing a processor that performs a complete standard encryption algorithm, such as AES, with one instruction may be desirable so that the processor may be certified as performing encryption in compliance with the standard. However, the cost of supporting that one specialized instruction may be prohibitive, particularly where the algorithm requires that a different version of a key be used for each round. In that case, the processor would include hardware to generate each round key from an input key every time the instruction is executed. As an alternative, embodiments of the present invention provide an instruction that performs an encryption algorithm using stored round keys.

Figure 1:
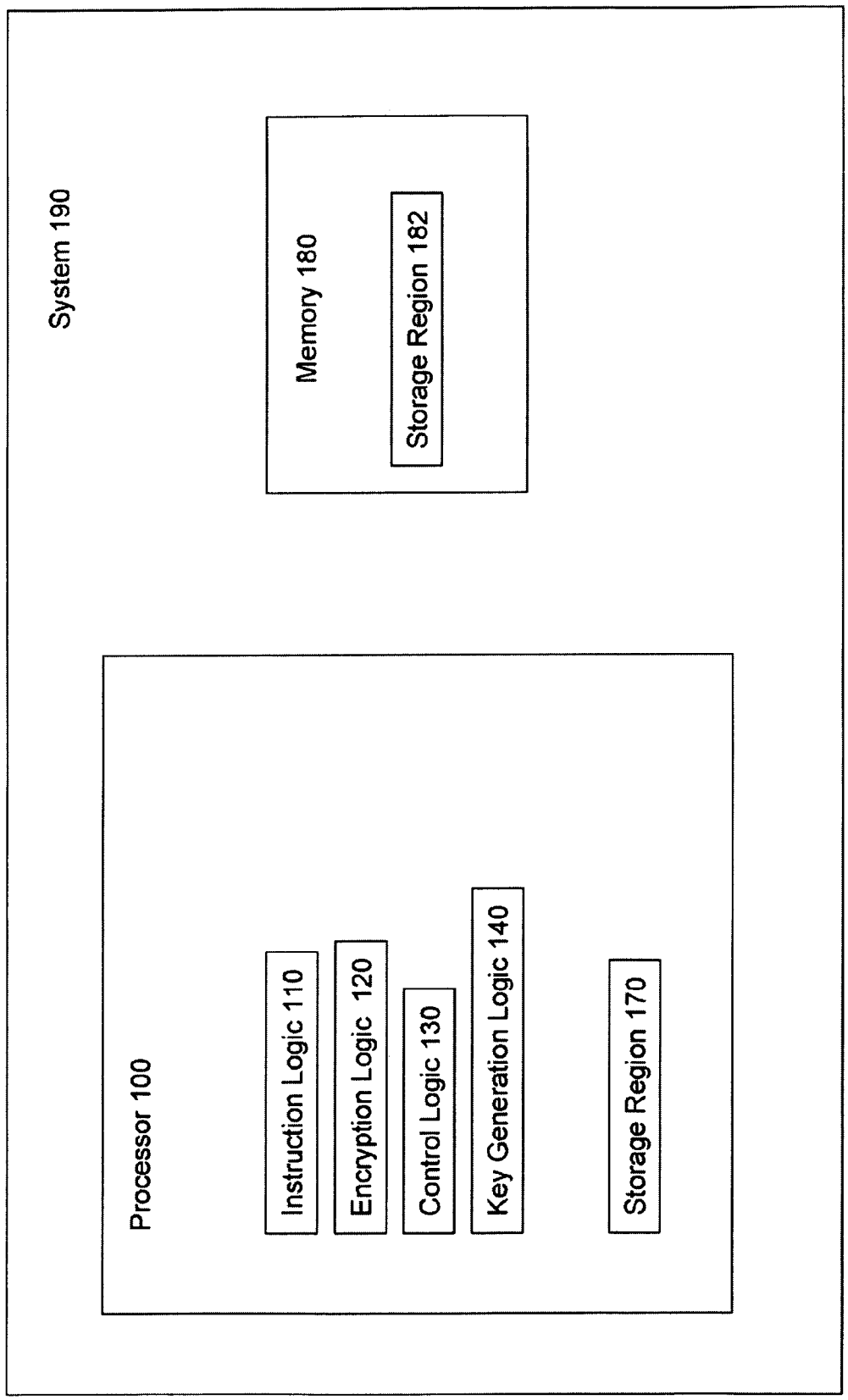
FIG. 1 illustrates a processor that supports an encryption instruction according to an embodiment of the present invention.

FIG. 1 illustrates processor 100, in system 190, according to an embodiment of the present invention. Processor 100 may be any type of processor, including a general purpose microprocessor, such as a processor in the Intel® Pentium® Processor Family, Itanium® Processor Family, or other processor family from Intel® Corporation, or another processor from another company, or a special purpose processor or microcontroller. Processor 100 may include multiple threads and multiple execution cores, in any combination. Processor 100 includes instruction logic 110, encryption logic 120, and control logic 130. Processor 100 may also include any other circuitry, structures, or logic not shown in FIG. 1.

Instruction logic 110 is to receive an encryption instruction. The encryption instruction may be any instruction to which the processor is designed to respond by executing an encryption algorithm, such as the AES algorithm. Instruction logic 110 may include any circuitry, logic, or other structure that recognizes, decodes, or otherwise receives the encryption instruction. Instruction logic 110 may also receive a decryption instruction, a key generation instruction, and/or any other instructions in the instruction set of processor 110.

Encryption logic 120 is to perform the encryption, including a number of rounds, where each round uses a corresponding round key. Encryption logic 120 may include any circuitry, logic, or other structures to execute the encryption algorithm, such as any number of arithmetic logic units, shifters, and other structures. Encryption logic 120 may be dedicated to encryption according to a single standard or algorithm, or may be used, in whole, in part, and/or together with other logic, to support encryption according to a different standard or algorithm, and/or to support decryption according to any of these algorithms, and/or may also be used for other operations. Processor 100 may also or instead include separate decryption logic to support decryption.

Control logic 130 is to fetch the round keys. Control logic 130 may include any circuitry, logic, or other structure, including microcode, state machine logic, programmable logic, or any other form of control logic, which causes processor 100 to fetch the round keys. Each round key is fetched for use by encryption logic 120 during the round to which it corresponds. The round keys may be stored in and fetched from a storage region within or accessible to processor 100.

For example, the round keys may be fetched from storage region 170 within processor 100 in one embodiment, or from storage region 182 within memory 180 in another embodiment. In an embodiment including storage region 170, it may be a storage region of any type of memory or storage elements within processor 100. It may be private or protected, for example, accessible only by executing an encryption, decryption, or key generation instruction. It may be cleared upon reset of processor 100. It may include contiguous storage locations to store an input key and each round key, in order. In an embodiment including storage 182, it may include contiguous storage locations to store each round key, in order.

Memory 180 may be static or dynamic random access memory, flash memory, magnetic or optical disk memory, any other type of medium readable by processor 100, or any combination of such mediums. Processor 100 and memory 180 may be coupled to or communicate with each other within system 190 according to any known approach, such as directly or indirectly through one or more buses, point-to-point, or other wired or wireless connections.

The round keys may be generated by executing a separate key generation instruction or a sequence of more general instructions. In one embodiment, processor 100 includes key generation logic 140 to generate the round keys in response to instruction logic 110 receiving a key generation instruction. Key generation logic 140 may include any circuitry, logic, or other structures to derive the round keys from the input key according to the specification of the encryption algorithm. In another embodiment, the round keys may be generated by software starting with the input key and executing a sequence of general purpose instructions according to the specification of the encryption algorithm. Following generation, the round keys may be stored in storage location 170 or 182, as part of a key generation instruction, or by software issuing general purpose store instructions.

An advantage of the present invention is that processor 100 may include key generation logic 140 at a reduced cost, because key generation may be performed only once to encrypt a large amount of information with the same input key. Therefore, key generation logic 170 may not need to be as fast as it would be to achieve performance comparable to a processor in which key generation is performed every time an encryption instruction is executed. Also, less power may be consumed by reducing the number of times key generation is performed.

The encryption, decryption, and/or key generation instructions may provide information pertinent to the encryption. The information may include information related to any one or more of the following: (1) the information to be encrypted, (2) the input key, from which the round keys are derivable, (3) the size or length (e.g., number of bits) of the input key, (4) the number of rounds, (5) the round keys, and (6) the encryption algorithm, cipher, or standard, or a particular mode of any of these. The information may be provided by the instruction, associated with the instruction, and/or related to other information pertinent to the encryption according to any known approach, such as any combination of different instructions, different instruction formats, different operand types and locations, etc. In one embodiment, encryption and decryption instructions may include a field for the name of a register in which the information to be encrypted or decrypted is stored. In one embodiment, encryption and decryption instructions may include a field for an address (e.g., a linear, virtual, physical or other address in memory 180) where the round keys are stored. In one embodiment, encryption and decryption instructions may include an immediate value to indicate the input key length and/or the number of rounds (for AES, the value of the input key length implies the number of rounds, and vice versa). In one embodiment, there may be different versions of the encryption and decryption instructions for different key lengths (e.g., for AES, there may be separate AESENCRYPT128, AESENCRYPT192, and AESENCRYPT256 instructions). In one embodiment, encryption, decryption, and/or key generation instructions may include a field for the name of a register or a memory address where the input key is stored.

Figure 2:
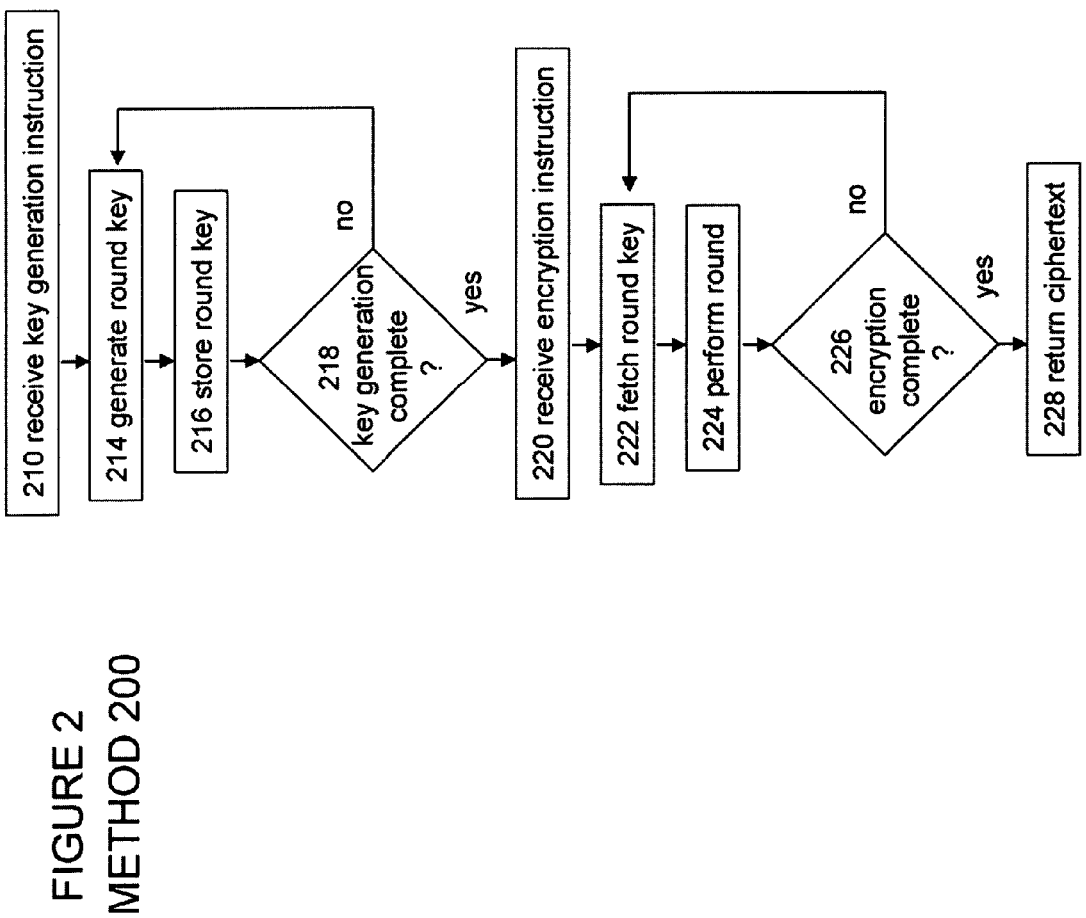
FIGS. 2 and 3 illustrate methods for using encryption instructions according to embodiments of the present invention.
Figure 3:
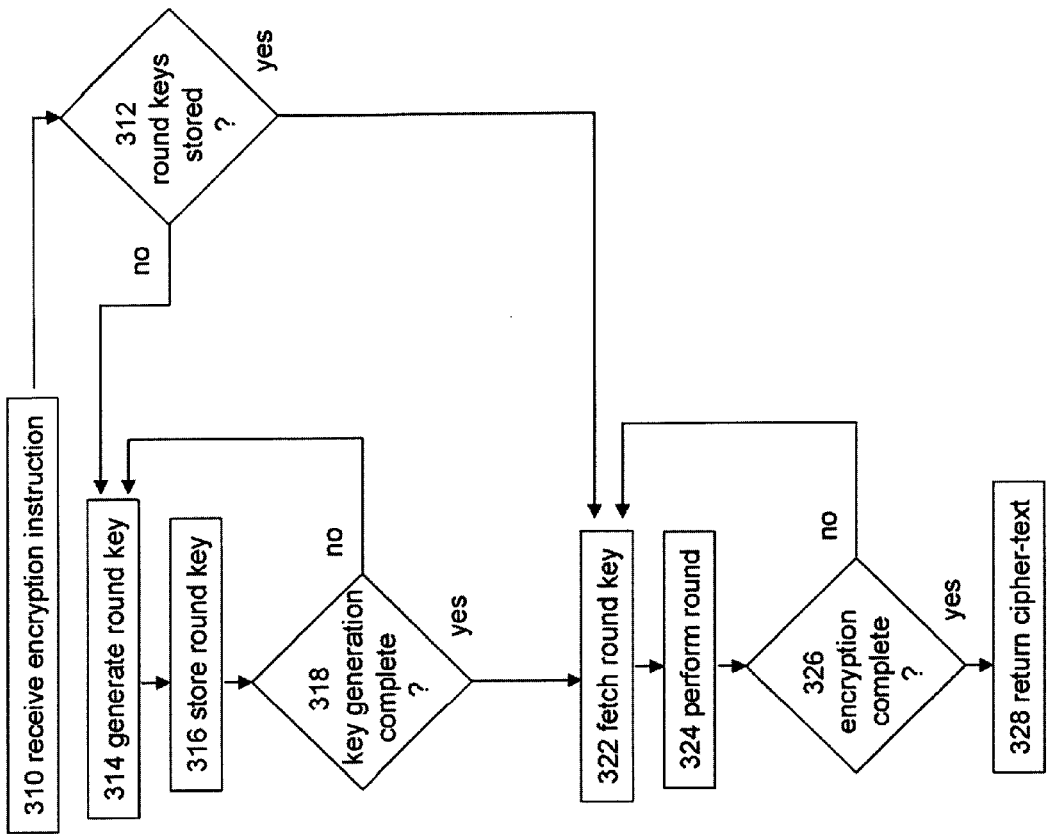

Returning to control logic 130, it may also control encryption logic 120, key generation logic 140, and/or any other execution logic based on signals from instruction logic 110, or based on any information from an encryption, decryption, or key generation instruction, to cause processor 100 to execute method embodiments of the present invention, such as methods 200 and 300, as illustrated in FIGS. 2 and 3, respectively. For example, control logic 130 may cause processor 100 to execute method embodiments of the present invention by executing one or more micro-instructions or micro-operations in response to receiving an encryption, decryption, or key generation instruction.

Control logic 130 may include microcode, state machine logic, programmable logic, or any other form of control logic within processor 100. In other embodiments, control logic 130 may be implemented in any form of hardware, software, or firmware, such as a processor abstraction layer, within a processor or within any device accessible or medium readable by a processor, such as memory 180.

FIGS. 2 and 3 illustrate method 200 and method 300, respectively, for using an encryption instruction according to embodiments of the present invention. Although method embodiments of the invention are not limited in this respect, reference may be made to elements of processor 100 to describe the method embodiments of FIGS. 2 and 3.

In box 210 of method 200, instruction logic 110 receives a key generation instruction including a field providing the name of a register where a value of an input key is loaded, a field providing the name of a register where an address of storage region 182 is loaded, and a field providing an immediate that indicates the key length and/or the number of rounds. More specifically, the address of storage region 182 that is provided may be the address of the first contiguous storage location where the round key for the first round is to be stored.

In boxes 214 to 218, in response to instruction logic 110 receiving the key generation instruction, control logic 130 and key generation logic 140 execute the key generation instruction. In box 214, a round key to be used for one round of the encryption algorithm is generated. For the first iteration of box 214, the round key is generated or derived by expanding or otherwise transforming the input key. For subsequent iterations of box 214, the round key may be generated or derived from the previously generated round key or from the input key. In box 216, the round key generated in box 214 is written to or stored into a storage location in storage region 182 in memory 180.

Boxes 214 and 216 are repeated until it is determined, in box 218, that all of the round keys have been generated and stored. For each successive iteration of box 214, the round keys may be generated in the order of the rounds, so that in box 216, each round key may be stored in contiguous locations, in order.

In box 220, instruction logic 110 receives an encryption instruction including a field providing the name of a register where the plain-text is loaded, a field providing the name of a register where an address of storage region 182 is loaded, and a field providing an immediate that indicates the key length and the number of rounds. More specifically, the address of storage region 182 that is provided may be the address of the first contiguous storage location where the round key for the first round has been stored.

In boxes 222 to 226, in response to instruction logic 110 receiving the key generation instruction, control logic 130 and encryption logic 120 execute the encryption instruction. In box 222, a round key is fetched from storage region 182. In box 224, a round of the encryption algorithm is performed using the round key fetched in box 222. For the first iteration of box 222, the address of storage region 182 provided by the encryption instruction is used to fetch the first round key. For each successive iteration of box 222, the address may be incremented by an appropriate amount to fetch the round keys from contiguous storage locations, in order.

Boxes 222 and 224 are repeated until it is determined, in box 226, that all of the rounds have been performed. If so, then in box 228, the result is returned by loading the cipher-text into the register in which the plain-text was provided.

Returning to box 222, fetching the round keys from storage location 182 in memory 180 may cause the contents of storage location 182 to be cached. Therefore, during subsequent executions of the encryption instruction using the same input key, the round keys may actually be fetched from cache rather than from memory 180.

Turning to method 300 in FIG. 3, in box 310, instruction logic 110 receives an encryption instruction including a field providing the name of a register where the plain-text is loaded, and a field providing the name of a register where a value of an input key is loaded. The encryption instruction may be one of a family of encryption instructions, where each member of the family is for encryption using a different key length and/or number of rounds (e.g., AESENCRYPT128, AESENCRYPT192, and AESENCRYPT256).

In boxes 312 to 328, in response to instruction logic 110 receiving the encryption instruction, control logic 130, key generation logic 140, and encryption logic 120 execute the encryption instruction. In box 312, it is determined whether the round keys are already stored in storage region 170. If not, key generation is performed in boxes 314 to 318, followed by encryption in boxes 320 to 326. If so, encryption is performed in boxes 320 to 326.

In one embodiment, box 312 may be performed by comparing the value of the input key from the encryption instruction to the contents of a storage location in storage region 170 that is reserved for the input key. This comparison may be performed over the whole input key length or over a portion of the input key length. For example, for AES encryption with a 256-bit input key and fourteen rounds, storage region 170 may be divided into sixteen contiguous locations of 128 bits each. The first two of these locations may be reserved for storage of the input key. Therefore, box 312 may be performed by first comparing the lower half of the input key to the contents of the second of the contiguous location in storage region 170, then comparing the upper half of the input key to the contents of the first of the contiguous locations in storage region 170.

In box 314, a round key to be used for one round of the encryption algorithm is generated. For the first iteration of box 314, the round key is generated or derived by expanding or otherwise transforming the input key. For subsequent iterations of box 314, the round key may be generated or derived from the previously generated round key or from the input key. In box 316, the round key generated in box 314 is written to or stored into its reserved storage location in storage region 170.

Boxes 314 and 316 are repeated until it is determined, in box 318, that all of the round keys have been generated and stored. For each successive iteration of box 314, the round keys may be generated in the order of the rounds, so that in box 316, each round key may be stored in contiguous locations, in order. In box 320, the input key is written to or stored into the storage location in storage region 170 that is reserved for the input key.

In boxes 322 to 326, encryption is performed. In box 322, a round key is fetched from storage region 170. In box 324, a round of the encryption algorithm is performed using the round key fetched in box 322. For each iteration of box 322, control logic 130 keeps track of the round number to fetch from the appropriate storage location in storage region 170.

Boxes 322 and 324 are repeated until it is determined, in box 326, that all of the rounds have been performed. If so, then in box 328, the result is returned by loading the cipher-text into the register in which the plain-text was provided.

Within the scope of the present invention, the methods illustrated in FIGS. 2 and 3 may be performed in a different order, with illustrated boxes omitted, with additional boxes added, or with a combination of reordered, omitted, or additional boxes. In one embodiment, an encryption or a decryption instruction may include an immediate to indicate whether or not the round keys have been generated and stored; if so, the instruction is executed with the stored round keys; if not, the round keys are generated first. In one embodiment, the execution of instructions may be pipelined, so, for example, some of the micro-operations performed by processor 100 may be performed concurrently. In an embodiment where an encryption or decryption instruction supports generating and storing round keys for a new input key and using stored round keys for an old input key, the micro-operation flow for a new input key may include generating and storing all the round keys before starting the first round of encryption or decryption, or, alternatively, starting each round of encryption as each round key is generated and storing the round keys concurrently or subsequently. Many more variations of these and other method embodiments are possible within the scope of the present invention.

Processor 100, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, embodiments of an invention for executing an encryption instruction using stored round keys have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
    instruction circuitry to receive an encryption instruction, the encryption instruction including a field for an address of a storage region;
    encryption circuitry to perform, in response to the instruction circuitry receiving the encryption instruction, encryption including a plurality of rounds, each round using a corresponding round key from a plurality of round keys;
    key generation circuitry to derive the plurality of round keys from an input key provided by the encryption instruction; and
    control logic to fetch, for use during each of the plurality of rounds, the corresponding round key from the storage region, to determine, based on a comparison of the input key provided by the encryption instruction to the contents of a storage location for the input key in the storage region, whether the storage region contains the plurality of round keys, and, in response to determining that the storage location does not contain the plurality of round keys, to cause the key generation circuitry to derive the plurality of round keys from the input key and to store the plurality of round keys in the storage region.

2. The processor of claim 1, wherein the storage region includes a plurality of contiguous storage locations, each to store one of the plurality of round keys, and the address is for the storage location for the round key corresponding to the first of the plurality of rounds.

3. The processor of claim 1, wherein the encryption instruction provides an input key size.

4. The processor of claim 1, further comprising the storage region.

5. A method comprising:
    receiving, by a processor, an encryption instruction, the encryption instruction including a field for an address of a storage region;
    determining, in response to receiving the encryption instruction and based on a comparison of an input key provided by the encryption instruction to the contents of a storage location for the input key in the storage region, whether the storage region contains a plurality of round keys;
    in response to determining that the storage location does not contain the plurality of round keys, deriving the plurality of round keys from the input key provided by the encryption instruction;
    storing the plurality of round keys in the storage region; and
    performing, by the processor in response to receiving the encryption instruction, encryption including a plurality of rounds, each round using a corresponding round key from the plurality of round keys.

6. The method of claim 5, further comprising fetching, for use during each of the plurality of rounds, the corresponding stored round key.

7. The method of claim 5, further comprising:
    receiving a key generation instruction; and
    generating and storing, in response to receiving the key generation instruction, the plurality of stored round keys.

8. The method of claim 5, wherein storing the plurality of round keys includes storing the input key in the storage location for the input key in the storage region.

9. A system comprising:
    a memory, and
    a processor including:
        instruction logic to receive an encryption instruction, the encryption instruction including a field for an address of a storage region in the memory;
        encryption logic to perform, in response to the instruction logic receiving the encryption instruction, encryption including a plurality of rounds, each round using a corresponding round key from a plurality of round keys;
        key generation circuitry to derive the plurality of round keys from an input key provided by the encryption instruction; and
        control logic to fetch, for use during each of the plurality of rounds, the corresponding round key from the storage region in the memory, to determine, based on a comparison of the input key provided by the encryption instruction to the contents of a storage location for the input key in the storage region, whether the storage region contains the plurality of round keys, and, in response to determining that the storage location does not contain the plurality of round keys, to cause the key generation circuitry to derive the plurality of round keys from the input key and to store the plurality of round keys in the storage region.

10. The system of claim 9, wherein the memory includes a plurality of contiguous storage locations, each to store one of the plurality of round keys, and the address is for the storage location for the round key corresponding to the first of the plurality of rounds.

* * * * *